UNITED STATES PATENT OFFICE.

FRANKLIN G. BEYLIK, OF GLENDALE, CALIFORNIA, ASSIGNOR OF ONE-HALF TO NOAH W. SCHWARTZLOSE, OF LOS ANGELES, CALIFORNIA.

PECTOUS MATERIAL AND PROCESS OF MAKING THE SAME.

1,393,660.     Specification of Letters Patent.     Patented Oct. 11, 1921.

No Drawing.     Application filed September 23, 1920. Serial No. 412,218.

*To all whom it may concern:*

Be it known that I, FRANKLIN G. BEYLIK, a citizen of the United States, residing at Glendale, in the county of Los Angeles and State of California, have invented new and useful Improvements in Pectous Materials and Processes of Making the Same, of which the following is a specification.

My invention relates to a pectous material and process of making the same.

It is an object of this invention to provide a simple, inexpensive yet efficient method of making a pectous material suitable for making jelly, jams and other confections.

As is well known fruits and vegetables contain varying amounts of pectin and pectic and pectosic acids. The pectous content varies not only with the different kinds of fruit or vegetable but also with the state of maturity of the same, there being less pectous contents the greater the degree of ripeness of the fruit or vegetable.

Most fruits, in their unripe condition, contain cellulose, starch, and some one or more vegetable acids, such as malic, citric, tartaric, and tannic, the last being almost invariably present, and causing the peculiar roughness and astringency of the unripe fruit. The characteristic constituent of unripe fruits, however, is pectose, a compound of carbon, hydrogen and oxygen, the composition of which has not been exactly determined. Pectose is quite insoluble in water, but during the ripening of the fruit it undergoes a change induced by the vegetable acids, and is converted into pectin ($C_{32}H_{40}O_{28}$), which is capable of dissolving in water, and yields a viscous solution. As the maturation proceeds, the pectin itself is transformed into pectic acid ($C_{16}H_{22}O_{15}$) and pectosic acid ($C_{32}H_{46}O_{31}$), which are soluble in boiling water, yielding solutions which gelatinize on cooling. It is from the presence of these acids, therefore, that many ripe fruits are so easily convertible into jellies.

As examples of fruits and vegetables containing the pectous substances referred to, and suitable for my purpose, the following are given: Apples, oranges, lemons, grapes, carrots, beets, hemp and jute. The pectous content in apples may run as high as eight-tenths per cent. by weight, oranges one and three-fourths per cent., beets one per cent.

My process contemplates the removal of all substances except the pectous content and the cellular tissue of the plant or fruit and making a product in which the pectous content is uniformly distributed in a form making it suitable for the preparation of jelly, jams and other confections.

My invention consists of the steps of the process and the resulting product hereinafter described and claimed.

The vegetables or fruits from which the pectous material is to be prepared are comminuted by either crushing or slicing in any suitable or preferred manner and are then dehydrated until all the water has been expelled. The dehydration may be carried out in any suitable apparatus and in any preferred manner. Care should, of course, be taken not to use high temperatures which would decompose the pectous material. The dehydrated material is now ground in any preferred manner to a fineness of preferably fifty mesh screen and treated with a suitable solvent for extracting the other substances except the pectous material present in the fruit or vegetable, such as sugar, fruit acids, fruit ether, fats, waxes, essential oils, albuminoids, peptoids, alkaloids, resinoids, salts and the like. The solvent I use is ethyl alcohol which usually answers the purpose, although other solvent, such as ether, chloroform, benzol and petroleum ether may be used either singly or collectively in connection therewith.

The mixture is now filtered, preferably, by means of a filter press and the insoluble residue is dried in a suitable dehydrator. The insoluble residue contains besides the cellular tissue pectin, pectic and pectosic acids uniformly distributed throughout the mass. The cellular tissue containing the pectous material just referred to is now put in suitable containers and is ready for the market.

The presence of cellular tissue matter assists mechanically in the dissolution of the pectous content which otherwise would take a long time to dissolve in water. The cellular tissue does not interfere with the making of perfectly clear jelly any more than the cellular tissue present in the fruit that is used for making jelly. The fruit juices which are made into jelly by means of my pectous material are strained through a cloth filter as is customary in making jelly.

In making jellies, jams and other confections it is merely necessary to add a small quantity of the pectous material to the fruit juices and the like which form the base of the jelly, jam or confection. The amount will vary according to the material with which it is to be used. For example in making jelly of grape juice two to four ounces of my pectous material to one gallon of grape juice is usually sufficient to make grape juice jelly.

Various changes in the steps of the process may be made by those skilled in the art without departing from the spirit of my invention as claimed.

I claim:

1. The process of making a pectous material comprising subjecting plant material having a pectous content to a solvent capable of dissolving substantially all other substances except the pectous content and cellular tissue, separating the insoluble matter from the solution and drying the insoluble matter.

2. The process of making a pectous material comprising comminuting plant material, dehydrating the same, subjecting the dehydrated material to a solvent capable of dissolving substantially all other substances except the pectous content and cellular tissue, separating the insoluble material from the solution, and drying the insoluble matter.

3. The process of making pectous material comprising comminuting plant material, dehydrating the same, treating the same with alcohol whereby substantially all other substances, except the pectous content and cellular tissue, are dissolved, separating the insoluble matter from the solution, and drying the insoluble matter.

4. A pectous material suitable for making jelly, jam and confections, consisting of dry cellular tissue having pectous substances uniformly distributed therein.

In testimony whereof I have signed my name to this specification.

FRANKLIN G. BEYLIK.